United States Patent [19]

Yeung

[11] Patent Number: 5,696,791
[45] Date of Patent: Dec. 9, 1997

[54] APPARATUS AND METHOD FOR DECODING A SEQUENCE OF DIGITALLY ENCODED DATA

[75] Inventor: Pak Nam Yeung, Kowloon, Hong Kong

[73] Assignee: Vtech Industries, Inc., Wheeling, Ill.

[21] Appl. No.: 372,959

[22] Filed: Jan. 17, 1995

[51] Int. Cl.⁶ .................................................. H04B 3/46
[52] U.S. Cl. .................... 375/244; 348/409; 341/143; 358/430
[58] Field of Search ........................... 375/242, 244, 375/246, 253, 316, 340; 341/76, 143; 348/409, 410, 472; 364/724.04; 358/261.1, 261.2, 430; 395/2.21

[56] References Cited

U.S. PATENT DOCUMENTS

4,569,058  2/1986  Grallert ........................... 375/244

OTHER PUBLICATIONS

Microsoft Corporation, "New Multimedia Data Types and Data Techniques", Apr. 15, 1994, pp. 18–24.

P.W. Noll, "Nonadaptive and Adaptive Differential Pulse Code Modulation of Speech Signals", Netherlands P.T. publication, Sep. 13, 1972, pp. 623–629.

*Primary Examiner*—Stephen Chin
*Assistant Examiner*—Amanda T. Le
*Attorney, Agent, or Firm*—Dick and Harris

[57] ABSTRACT

A method and apparatus of decoding a sequence of digitally encoded data. A sequence of digitally encoded data is received. If the digitally encoded data has a value indicative of a single corresponding decoded value, the corresponding decoded value is generated. If the digitally encoded data has a value indicative of a plurality of predetermined values, a unique decoded value is selected from the plurality of predetermined decoded values. The particular one of the plurality of predetermined values selected is determined by the number of consecutively received digitally encoded data values having a value indicative of a plurality of predetermined values, and further according to the sign bit of the most recently received digitally encoded datum having a value indicative of a single corresponding decoded value.

14 Claims, 2 Drawing Sheets

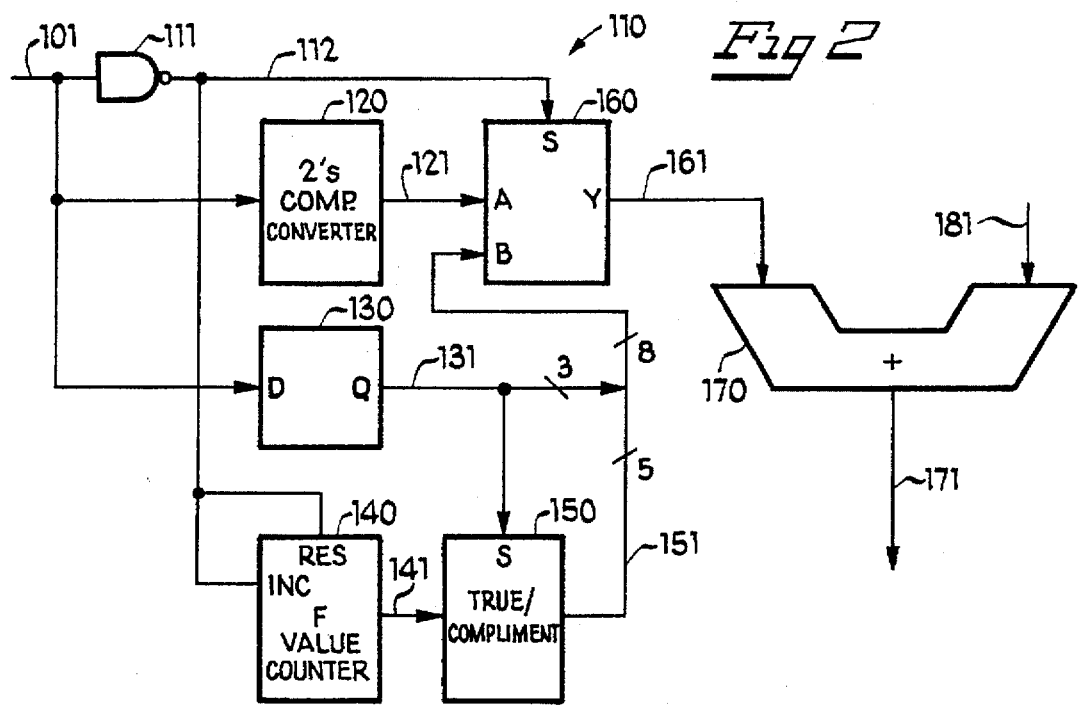
*Fig 2*
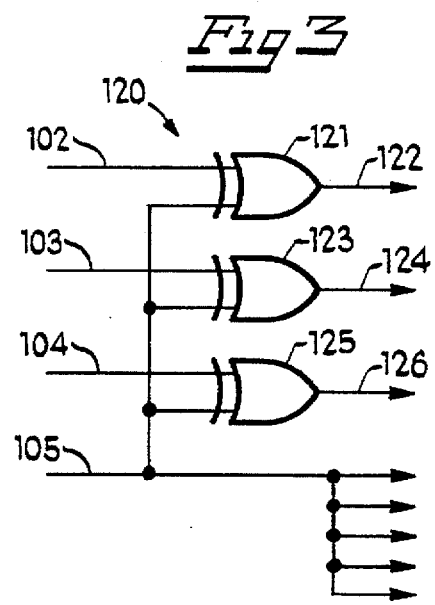
*Fig 3*
*Fig 4*
| | DATA | DIFFERENTIAL | |
|---|---|---|---|
| 300 | 0000 | 0 | 320 |
| 301 | 0001 | +1 | 321 |
| 302 | 0010 | +2 | 322 |
| 303 | 0011 | +3 | 323 |
| 304 | 0100 | +4 | 324 |
| 305 | 0101 | +5 | 325 |
| 306 | 0110 | +6 | 326 |
| 307 | 0111 | +7 | 327 |
| 308 | 1000 | −1 | 328 |
| 309 | 1001 | −2 | 329 |
| 310 | 1010 | −3 | 330 |
| 311 | 1011 | −4 | 331 |
| 312 | 1100 | −5 | 332 |
| 313 | 1101 | −6 | 333 |
| 314 | 1110 | −7 | 334 |
| 315 | 1111 | +8/−9,+16/−17,+24/−25 | 335 |

APPARATUS AND METHOD FOR DECODING A SEQUENCE OF DIGITALLY ENCODED DATA

BACKGROUND OF THE INVENTION

The present invention relates in general to the decoding digitally encoded data, and, more particularly, to the decoding of differential pulse code modulated (DPCM) data.

DPCM encoding and decoding is well-known in the art as a method for obtaining relatively high bandwidth transmission and storage of digital data, while using a relatively low of number of digital bits to store and transmit the encoded information. A typical DPCM encoder includes a predictor. The predictor executes an algorithm which uses a predetermined quantity of previous samples within a sequence of digital data to be encoded, in order to produce an estimate of the next sample. The difference between the predicted next value and the actual next value is determined. This differential value is encoded and is transmitted as the DPCM encoded data. A typical DPCM decoder contains a predictor identical to the predictor in the corresponding DPCM encoder. This predictor again compares a predetermined quantity of previous samples of decoded DPCM data, to determine the predicted next decoded sample. The next differential value in the DPCM encoded data sequence is added or subtracted (as determined by the sign of the DPCM data) to the predicted value, in order to determine the next decoded value in the sequence.

The above-described DPCM encoding method, together with variants such as adaptive differential pulse code modulation (ADPCM, which uses a predictor capable of "learning"), have gained widespread acceptance, particularly in applications such as the digital encoding of sound, such as music and human speech. One shortcoming of implementing a typical DPCM or ADPCM method, however, is that relatively complex prediction algorithms are employed, such that, in turn, expensive and large scale circuitry are generally necessary. Moreover, a further issue relates to the fact that a relatively few number of bits are generally used in the encoded DPCM data, whereby only relatively small shifts upward or downward, with respect to the predicted signal, may be transmitted in the DPCM encoded data. A rapid shift in the value of the actual data, beyond that which can be predicted from previous samples, can thus be difficult to accommodate using typical DPCM or ADPCM techniques.

Accordingly, it is an object of the present invention to provide a method and apparatus for decoding digitally encoded data, wherein a predictor circuit is not required.

It is another object of the present invention to provide a method and apparatus for decoding digital data, wherein the digitally encoded data comprises differential data capable of specifying relatively large swings in decoded data values, with relatively few bits required to encode the data.

These and other objects, features, and modes of operation of the present invention will become apparent in light of the present specification, claims and drawings.

SUMMARY OF THE INVENTION

The present invention comprises a method of decoding a sequence of digitally encoded data having a plurality of encoded values. At least one of the encoded values is indicative of a selected one of a plurality of decoded values. The method comprises the steps of: a) receiving a digitally encoded datum; b) determining if the digitally encoded datum has a value indicative of a single corresponding decoded value; c) generating a corresponding decoded value if the digitally encoded datum has a value indicative of a single corresponding decoded value; d) ascertaining whether the digitally encoded datum has a value indicative of a plurality of predetermined decoded values; e) calculating a number of consecutively received digitally encoded data having a value indicative of a plurality of predetermined values; f) selecting a decoded value from the plurality of predetermined decoded values if the digitally encoded datum has a value indicative of a plurality of decoded values (where the decoded value is selected from the plurality of predetermined decoded values according to the number of consecutively received digitally encoded data values indicative of a plurality of predetermined decoded values); and g) continuously repeating steps a through f above until all digitally encoded data within the sequence are received and decoded.

In the preferred embodiment, the sequence of digitally encoded data is differential pulse code modulated data, and step f is followed by the additional step of adding the decoded value to a previous value in a decoded sequence, in order to form the next value in a decoded sequence. Also, in a preferred embodiment, the plurality of predetermined decoded values is a periodic sequence of values. The selected decoded value has a position within the periodic sequence coinciding with the number of consecutively received digitally encoded data having a value indicative of a plurality of predetermined decoded values. Moreover, in the preferred embodiment, the selected decoded value further coincides with a sign-bit of a most recently received digitally encoded datum having a value indicative of a single corresponding decoded value. The periodic sequence preferably includes the values −49, −41, −33, −25, −17, −9, 8, 16, 24, 32, 40, and 48.

Also, in the preferred embodiment, the encoded data value indicative of a selected one of a plurality of predetermined data values is assigned a 4-bit value of "f" in hexadecimal representation. All other encoded data values are indicative of a single corresponding decoded value.

The present invention also comprises an apparatus for decoding a sequence of digitally encoded data having a plurality of encoded values. At least one of the encoded values is indicative of a selected one of a plurality of predetermined decoded values. The apparatus includes receiving means for receiving a digitally encoded datum. In the preferred embodiment, the receiving means comprises a register file.

Ascertaining means, operatively coupled to the receiving means, are provided for ascertaining whether the received digitally encoded datum has a value indicative of a plurality of predetermined decoded values. In the preferred embodiment, the ascertaining means comprises a NAND gate.

Calculating means, operatively coupled to the ascertaining means, are provided for calculating a number of digitally encoded data values consecutively received and having a value indicative of a plurality of predetermined values. In the preferred embodiment, the calculating means comprises a counter.

Generating means, operatively coupled to the receiving means, are provided for generating a single corresponding decoded value for received digitally encoded data not having a value indicative of a plurality of predetermined decoded values. In the preferred embodiment, the generating means comprises a 2's complement converter.

Selecting means, operatively coupled to the calculating means, are provided for selecting a predetermined decoded value from the plurality of decoded values for received digitally encoded data having a value indicative of a plurality of predetermined decoded values. The predetermined decoded values are selected according to the number of consecutively received digitally encoded data values indicative of a plurality of predetermined data values. In the preferred embodiment, the selecting means comprises a multiplexer operatively coupled to the counter.

Also, in the preferred embodiment, the sequence of digitally encoded data is differential pulse code modulated data, and the apparatus further includes adding means for adding the decoded values to a previous value in a decoded sequence, in order to form a next value in a decoded sequence.

BRIEF DESCRIPTION OF THE DRAWINGS

FIG. 2 of the drawings is a schematic diagram of the DPCM decoder;

FIG. 3 of the drawings is a schematic diagram of the 2's complement converter; and FIG. 4 of the drawings is a table of encoded data values and their corresponding decoded differential values.

DETAILED DESCRIPTION OF THE DRAWINGS

Figure 1:
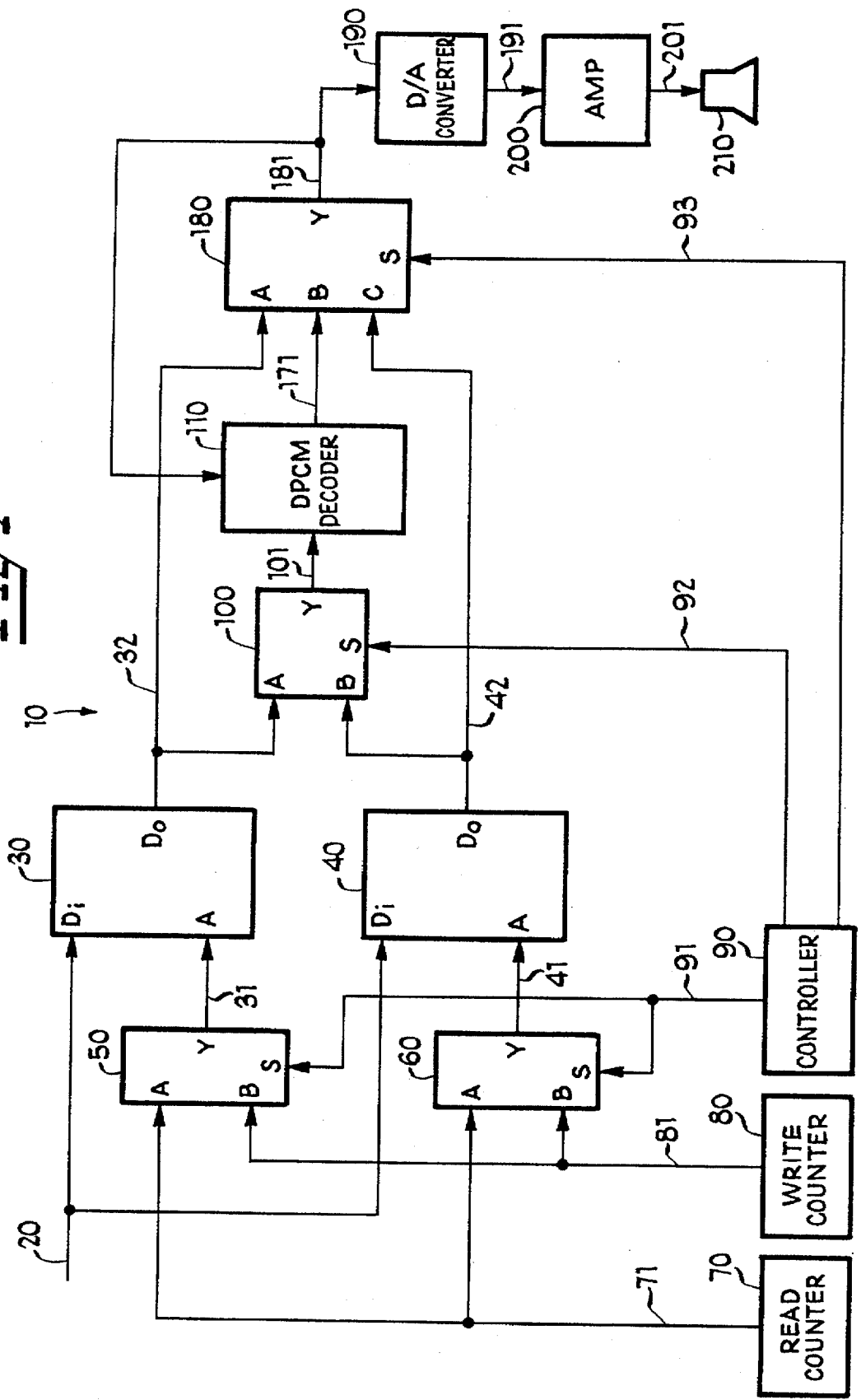
FIG. 1 of the drawings is a schematic diagram of the present decoder apparatus.

While this invention is susceptible of embodiment in many different forms, there is shown in the drawings and will herein be described in detail, one specific embodiment, with the understanding that the present disclosure be considered as an exemplification of the principles of the invention and is not intended to limit the invention to the embodiment illustrated.

The encoded data which is decoded by the present invention, and the corresponding decoded, differential value employed to generate a decoded sequence from a corresponding sequence of digital data, is shown in FIG. 4. In the preferred embodiment, each encoded datum is four-bits in width, and all sixteen possible encoded data values are shown in FIG. 4 in binary representation, as shown by reference numerals 300–315. Across from each binary encoded data value is shown its corresponding decoded differential value, as shown by reference numerals 320–335. Each corresponding decoded differential value is added to the most recently decoded data value in the fully decoded sequence, in order to generate the next decoded data value in the sequence.

As shown in FIG. 4, encoded data value 0000 corresponds to a decoded differential value of 0. Encoded data value 0001 corresponds to a differential of +1. Encoded data value 0010 corresponds to a differential value of +2. Encoded data value 0011 corresponds to a differential of +3. Encoded data value 0100 corresponds to a decoded value of +4. Encoded data value 0101 corresponds to a differential value of +5. Encoded data value 0110 corresponds to a decoded differential value of +6. Encoded data value 0111 corresponds to a differential value of +7. Encoded data value 1000 corresponds to a decoded differential value of −1. Encoded data value 1001 corresponds to a differential value of −2. Encoded data value 1010 corresponds to a differential value of −3. Encoded data value 1011 corresponds to a differential value of −4. Encoded data value 1100 corresponds to a decoded differential value of −5. Encoded data value 1101 corresponds to a differential value of −6. Encoded data value 1110 corresponds to a differential value of −7.

Unlike encoded data values 0000 through 1110, encoded data value 1111 does not correspond to a single decoded, differential value. Rather, encoded data value 1111 may correspond to any one of a number of preselected decoded differential values, selected from a sequence of differential values 335, a subset of which is shown in FIG. 4. The positive portions of the sequence are increasing values in increments of 8, including 8, 16, 24, 32, 40, 48, etc. The negative portion of the sequence are decreasing values in increments of −8, but beginning with −9, including the values −9, −17, −25, −33, −41, −49, etc. Whenever an encoded value of 1111 appears in the data sequence, its corresponding predetermined decoded differential value is dependent upon two things: the number of consecutive 1111 ("f" in hexadecimal notation) encoded data values consecutively received, and the sign, as indicated by the most significant bit, of the encoded data value most recently received immediately prior to the sequence of 1111 values.

For example, if a data value of 0011 is followed by three consecutive data values of 1111, the corresponding decoded differential values are as follows: the data value of 0011 is directly decoded as a differential of +3, as shown in FIG. 4. Since this value is positive, the first occurrence of 1111 is decoded as the first positive value in the corresponding differential sequence, or +8. The second consecutive occurrence of 1111 is decoded as the second value in the positive portion of the preselected sequence, or +16. The third consecutive value of 1111 is decoded as the third positive preselected value from the sequence, or +24. Additional positive values would similarly be selected from the sequence in additional increments of +8, until a non-"f" hexadecimal value is received, at which time the value's single corresponding decoded value is utilized.

Another example, illustrating the use of negative portions of the preselected sequence, is as follows. If an encoded data value of 1001 is followed by two consecutive data values of "f" hexadecimal, the data value of 1001 is directly decoded and replaced by its corresponding decoded differential of −2, as shown in FIG. 4. Since this value is negative, the first occurrence of 1111 is replaced by the first negative value in the predetermined sequence, or −9. The second consecutive occurrence of 1111 is replaced with the differential corresponding to the second negative value in the preselected sequence, or −17. This process will continue, replacing additional sequential occurrences of "f" hexadecimal with additional negative values from the sequence, decreasing by −8 with each additional occurrence, until a non-1111 value is decoded.

In this manner, the use of one or more sequential "f" hexadecimal data values allows a relatively large differential, much larger than in the range of +7 or −7, to be rapidly achieved, yet still requiring only four bits per sample to encode the data.

The present decoder apparatus 10 is shown in FIG. 1 as comprising register files 30 and 40, address multiplexers 50 and 60, read counter 70, write counter 80, controller 90, bank/nibble multiplexer 100, DPCM decoder 110, 3-to-1 registered multiplexer 180, digital-to-analog converter 190, amplifier 200, and speaker 210.

As shown in FIG. 1, a sequence of digitally encoded data 20 is coupled to the data input pins of register files 30 and 40. Digitally encoded data 20 may be generated by a corresponding encoder, which may be constructed from discrete components. Alternatively, digitally encoded data 20 may be generated in software, such as by a personal computer, and output from, for example, a parallel printer port. Decoder apparatus 10 may thus comprise a sound-generating peripheral attached to the printer port of a personal computer.

Register files 30 and 40 each receive and store 32 8-bit bytes of data. Encoded data input 20 is thus 8-bits wide. Each 8-bit value received over data input 20 contains two encoded data values; a first 4-bit data value in the lower order-nibble, and a second 4-bit data value in the higher-order nibble.

Register files 30 and 40 are operated together as conventional "ping-pong" buffers: i.e., they alternate, relative to each other, as read and write buffers. While one buffer is being written to, the other buffer is being read, or flushed. When one buffer is full and the other has been fully read, the function of the two register files are reversed. The one previously flushed is now written to, and the one which is now full is read from, or flushed. Although, in the preferred embodiment, register files are employed to buffer data, other devices, such as FIFO buffers or RAMs, may alternatively be used.

The address inputs 31 to register file 30 are supplied by address multiplexer 50. The address inputs 41 to register file 40 are supplied by address multiplexer 60. Address multiplexer 50 and 60 each receive the 5-bit output 71 from read counter 70, and the 5-bit output 81 from write counter 80. Control signal 91, output from controller 90, is coupled to the select inputs of address multiplexers 50 and 60. When register file 30 is in read mode and register file 40 is in write mode, address multiplexer 50 is selected to pass the output of read counter 70 to the address inputs of register file 30, and address multiplexer 60 is selected to pass the output of write counter 80 to register file 40. When the read/write function of these register files are reversed, the select signals of the address multiplexers are similarly reversed, such that the output of write counter 80 is passed through to the address inputs of register file 30, while the output of read counter 70 is output to register file 40. Counter outputs 71 and 81 accordingly specify and sequence through the particular registers within register files 30 and 40 at which data is read and written. In this manner, data is continuously read and written from the register files, being stored and accessed in consecutive locations within each 32-byte buffer.

The 8-bit outputs of register files 30 and 40, signal lines 32 and 42, respectively, are each input to bank/nibble multiplexer 100, as shown in FIG. 1. Bank/nibble multiplexer 100 selects the bank, or register file, which is currently in read mode. Moreover, as further directed by control signal 92, as output by controller 90, bank/nibble multiplexer 100 sequentially selects the low order and high order nibbles from the 8-bit values output from register files 30 and 40. Accordingly, the buffered stream of 8-bit values, originally received over data lines 20, are output in a 4-bit sequence, on signal line 101. Each value within this 4-bit nibble sequence represents a single data sample of encoded DPCM data. This DPCM data 101 is then decoded by DPCM decoder 110, which outputs an 8-bit fully decoded pulse code modulated (PCM) data stream to 3-to-1 registered multiplexer 180.

3-to-1 registered multiplexer 180 also receives the 8-bit outputs 32 and 34 directly from register files 30 and 40, respectively. 3-to-1 registered multiplexer 180 accordingly allows the DPCM decoding process to be bypassed. Control signal 93, output from controller 90, selects whether decoded PCM data 171 is passed through registered multiplexer 180 to 8-bit output 181, or whether "raw" buffered data 32 or 34 is passed to output 181. Accordingly, the present apparatus is capable of operating in a second mode, wherein 8-bit PCM data is received, rather than 4-bit DPCM data being received. When in this second mode of operation, no DPCM decoding is required, and the received data can be directly converted to an analog value for amplification and sound production.

This second mode is also employed for the first 8-bit byte of DPCM data within each 32-byte block of data contained within register files 30 and 40. Whenever the first byte of data is read from one of these register files, as indicated by output 71 of read counter 70 being equal to 00000, controller 90 causes this byte of data to bypass DPCM decoder 110, by selecting the appropriate corresponding input of registered multiplexer 180. Accordingly, the first byte of each 32-byte group of DPCM data is not treated as being a DPCM differential value, but is instead treated as being a base PCM value to which the 62 subsequent 4-bit DPCM differential values within each 32-byte block are to be applied.

The 8-bit output 181 of registered multiplexer 180 is output to digital-to-analog converter 190. Output 181 of registered multiplexer 180 is also output to DPCM decoder 110. Output 181 comprises the 8-bit fully decoded PCM data stream, and is accordingly output to DPCM decoder 110 for addition to the decoded DPCM differential values in order to form the next value in the 8-bit fully decoded PCM data stream. The analog output 191 of D/A converter 190 is amplified by amplifier 200, generating output waveform 201. Output form 201 drives speaker 210. In this manner, data received over data lines 20, which may comprise a sequence of either 4-bit DPCM data (packed two consecutive nibbles per byte) or a sequence of 8-bit PCM data, is converted to sound.

DPCM decoder 110 is shown in detail in FIG. 2 as comprising NAND gate 111, 2's complement converter 120, sign-bit register 130, F value counter 140, true/complement selector 150, multiplexer 160, and adder 170.

The 4-bit DPCM data stream 101 is input to quad-input NAND gate 111. The output of NAND gate 111, signal 112, is thus a flag, indicating whether the current DPCM data value is equal to "f" in hexadecimal notation, and is thus indicative a unique one of a plurality of predetermined values, or is not equal to "f" hexadecimal, and is instead indicative of a single corresponding decoded value.

2's complement converter 120 converts the fifteen non-"f" hexadecimal DPCM data values to their equivalent differential value, in signed 2's complement representation, represented by output signal 121. 2's complement converter 120 is shown in detail in FIG. 3 as comprising exclusive-or (XOR) gates 121, 123, and 125. The 4-bit DPCM data, (101 of FIG. 1 and 2), is shown in FIG. 3 as comprising least significant bit 102, bit 103, bit 104, and most significant bit, or sign-bit, 105. Sign-bit 105 is employed together with exclusive-or gates 121, 123, and 125 to selectively invert inputs 102, 103, and 104, generating outputs 122, 124, and 126. These three bits are passed through directly when sign-bit 105 is positive, as indicated by a zero value; and are inverted when sign-bit 105 is negative, as indicated by a "1" value. As shown in FIG. 3, sign-bit 105 is sign-extended into four additional bits, creating an 8-bit signed 2's complement output.

Referring back to FIG. 2, the most significant bit (MSB) of the most recently received 4-bit PCM data 101 which is not equal to "f" hexadecimal is stored within sign-bit register 130, and represented by output 131.

When a PCM data value received is not equal to "f" hexadecimal, as indicated by signal 112, multiplexer 160 is switched to pass through output 121 from 2's complement converter 120 as multiplexer output 1 61, to one side of adder 170.

On an occurrence of "f" hexadecimal DPCM data value, as indicated by signal 112, which is not immediately preceded by a prior "f" hexadecimal DPCM data value, 5-bit "f" value counter 140 is reset to an initial value of 00001. Thereafter, for each additional consecutive occurrence of an additional "f" hexadecimal DPCM data value, "f" value counter 140 is incremented, rather than reset. The 5-bit output 141 of "f" value counter 140 is input to true/complement selector 150. The output of sign-bit register 130, which stores the sign-bit of the data value received immediately prior to the first occurrence of an "f" hexadecimal DPCM data value, is employed to switch true/complement selector 150. When the output of sign-bit register 130 is positive, the output of "f" value counter 140 is passed directly through true/complement selector 150, as output signal 151. When the output of sign-bit register 131 is a negative sign, however, the output of true/complement selector 150 is an inversion of the output of "f" value counter 140. In either case, the output of true/complement selector 151 forms the five most-significant bits of an 8-bit input to multiplexer 160. The value output from sign-bit register 131 forms the three least-significant bits of this input to multiplexer 160. In this manner, the first occurrence of an "f" value, following a positive non-"f" hexadecimal value, results in a value of +8 being input to 1 input of multiplexer 160. Thereafter, additional consecutively received DPCM data values equal to 1111 result in increments of "f" value counter 140, and resultant increments, by increments of +8 due to the 3-bit "shifting" of the output of true/complement converter 151, to the input of multiplexer 160. In this manner, consecutive "f" hexadecimal DPCM data values result in a sequence of +8, +16, +24, etc. being input into multiplexer 160.

Similarly, when the output of sign-bit register 130 is a "1", indicating a negative sign received immediately prior to the sequence of one or more "f" hexadecimal DPCM values, the inversion of the "f" value counter output by true/complement converter 150, together with the 3-bit shift, results in a sequence of −9, −17, −25, etc. being generated and input to multiplexer 160, in 2's complement representation.

Depending upon whether the present value received is equal to 1111, as indicated by signal 112, multiplexer 160 is switched to select either the output of 2's complement converter 120 or the output of true/complement selector 150. Accordingly, the decoded differential sequence is output on 8-bit signal lines 161 to one side of 8-bit adder 170. Inasmuch as the output of the multiplexer 160 is in 2's complement format, the decoded differential value will either be added or subtracted by adder 170. The other side of adder 170 receives output 181 from registered multiplexer 180, the most recent value in the fully decoded 8-bit PCM data sequence. In this manner, each successive sample in the differential, decoded data stream 161 is continuously added to (or subtracted from) the previous fully decoded PCM data value 181, creating a continuous stream of fully decoded 8-bit PCM data 171.

In operation, digitally encoded data is received by register files 30 and 40. Quad-input NAND gate 111 is employed to determine if the digitally encoded data has a value indicative of a single corresponding decoded value (i.e., is not equal to "f" hexadecimal), and to ascertain whether the digitally encoded data has a value indicative of a plurality of predetermined decoded values (i.e., is equal to "f" hexadecimal). If the digitally encoded data has a value indicative of a single corresponding value, 2's complement converter 120 is employed to generate a corresponding decoded value. If the digitally encoded data has a value indicative of a plurality of predetermined decoded values, "f" value counter 140, together with sign-bit register 130 and true/complement selector 150, are employed to select a particular value from the plurality, or sequence, of the predetermined decoded values. This selection is according to the number of consecutively received digitally encoded data values indicative of a plurality of predetermined decoded values, as indicated by the present output 141 from "f" value counter 140. This value is further determined by the sign-bit of the most recently received digitally encoded data having a value indicative of a single decoded value, as indicated by output 131 of sign-bit register 130. In particular, a unique value is selected from the sequence including the values−49, −41, −33, −25, −17, −9, 8, 16, 24, 32, 40, and 48. The unique value selected depends upon the number of consecutively received "f"-valued digitally encoded data, together with the sign of the most recently received non-"f" hexadecimal digitally encoded data value. The decoded differential value, whether output from 2's complement converter 120 or true/complement converter 150, is added to the most recent final output data value 181, to generate the fully decoded PCM data sequence. These steps are continuously repeated until all received DPCM data is processed.

The foregoing description and drawings merely explain and illustrate the invention and the invention is not limited thereto except insofar as the appended claims are so limited, as those skilled in the art who have the disclosure before them will be able to make modifications and variations therein without departing from this scope of the invention.

What is claimed is:

1. A method of decoding a sequence of digitally encoded data having a plurality of encoded values, at least one of the encoded values being indicative of a selected one of a plurality of predetermined decoded values, the method comprising the steps of:

a. receiving a digitally encoded datum;
   b. determining if the digitally encoded datum has a value indicative of a single corresponding decoded value;
   c. generating a corresponding decoded value if the digitally encoded datum has a value indicative of a single corresponding decoded value;
   d. ascertaining whether the digitally encoded datum has a value indicative of a plurality of predetermined decoded values;
   e. calculating a number of consecutively received digitally encoded data having a value indicative of a plurality of predetermined decoded values;
   f. selecting a decoded value from the plurality of predetermined decoded values if the digitally encoded datum has a value indicative of a plurality of predetermined decoded values, the decoded value being selected from the plurality of predetermined decoded values according to the number of consecutively received digitally encoded data values indicative of a plurality of predetermined decoded values; and
   g. continuously repeating steps a through f until all digitally encoded data within the sequence are received and decoded.

2. The method according to claim 1, wherein the sequence of digitally encoded data is differential pulse code modulated data, and step f is followed by the additional step of:

adding the decoded value to a previous value in a decoded sequence to form the next value in the decoded sequence.

3. The method according to claim 1, wherein the plurality of predetermined decoded values is a periodic sequence of values.

4. The method according to claim 3, wherein the selected decoded value has a position within the periodic sequence coinciding with the number of consecutively received digitally encoded data having a value indicative of a plurality of predetermined decoded values.

5. The method according to claim 4, wherein the selected decoded value has a position within the periodic sequence coinciding with the number of consecutively received digitally encoded data having a value indicative of a plurality of predetermined decoded values and further coinciding with a sign-bit of a most recently received digitally encoded datum having a value indicative of a single corresponding decoded value.

6. The method according to claim 5, wherein the periodic sequence includes the values −49, −41, −33, −25, −17, −9, 8, 16, 24, 32, 40, and 48.

7. The method according to claim 1, wherein the encoded data value indicative of a selected one of a plurality of predetermined decoded values is assigned a 4-bit value of "f" in hexadecimal representation.

8. An apparatus for decoding a sequence of digitally encoded data having a plurality of encoded values, at least one of the encoded values being indicative of a selected one of a plurality of predetermined decoded values, the apparatus comprising:

means for receiving a digitally encoded datum;

means operatively coupled to the receiving means for ascertaining whether the received digitally encoded datum has a value indicative of a plurality of predetermined decoded values;

means operatively coupled to the ascertaining means for calculating a number of digitally encoded data values consecutively received and having a value indicative of a plurality of predetermined decoded values;

means operatively coupled to the receiving means for generating a single corresponding decoded value for received digitally encoded data not having a value indicative of a plurality of predetermined decoded values; and means operatively coupled to the calculating means for selecting a predetermined decoded value from the plurality of decoded values for received digitally encoded data having a value indicative of a plurality of predetermined decoded values, the predetermined decoded value being selected according to the number of consecutively received digitally encoded data values indicative of a plurality of predetermined data values.

9. The apparatus according to claim 8, wherein the receiving means comprises a register file.

10. The apparatus according to claim 8, wherein the ascertaining means comprises a NAND gate.

11. The apparatus according to claim 8, wherein the calculating means comprises a counter.

12. The apparatus according to claim 8, wherein the generating means comprises a 2's complement converter.

13. The apparatus according to claim 11, wherein the selecting means comprises a multiplexer operatively coupled to the counter.

14. The apparatus according to claim 8, wherein the sequence of digitally encoded data is differential pulse code modulated data, and the apparatus further includes means for adding the decoded values to a previous value in a decoded sequence to form the next value in a decoded sequence.

* * * * *